United States Patent [19]

Tewksbury

[11] 3,750,179

[45] July 31, 1973

[54] SINGLE CHANNEL DUPLEX SPACE LINKED PULSE COMMUNICATIONS SYSTEM

[75] Inventor: John Merle Tewksbury, Lutherville, Md.

[73] Assignee: The Bendix Corporation, Baltimore, Md.

[22] Filed: Nov. 8, 1971

[21] Appl. No.: 196,827

Related U.S. Application Data

[63] Continuation of Ser. No. 873,869, Nov. 4, 1969, abandoned.

[52] U.S. Cl. .............. 343/175, 178/69.5 R, 325/15, 179/15 BS

[51] Int. Cl. .............................................. H04b 7/20

[58] Field of Search .................... 343/175, 176, 178, 343/179; 325/15, 16, 13; 178/69.5 R; 179/15 BS

[56] References Cited

UNITED STATES PATENTS 3,639,838 2/1972 Kuhn et al. ......................... 343/179

*Primary Examiner*—Richard Murray
*Attorney*—Bruce L. Lamb, William G. Christoforo et al.

[57] ABSTRACT

In a single channel, polystation duplex space linked pulse communication system, keying of each of the continuously operating transmitters is controlled by a local oscillator. Each cycle a local of oscillator is modified by pulses received from other stations, to reduce or increase the period as needed to produce identical periods in all oscillators. Since the pulses from other stations received at a local station are not perceptible during its own transmission, and no control is then exerted, an equilibrium condition is immediately established in which the departure from coincidence of transmitted and received pulses at each station is proportioned to its need for control. Intelligent modulation of the pulse period at any station is then evident and may be recovered at all stations.

39 Claims, 6 Drawing Figures

INVENTOR
J. M. TEWKSBURY
BY Plante, Arens, Hartz, Smith & Thompson
ATTORNEYS

INVENTOR
J. M. TEWKSBURY
BY Plante Arens Hartz Smith & Thompson
ATTORNEYS

INVENTOR
J. M. TEWKSBURY
BY Plante, Arens, Hartz
Smith & Thompson
ATTORNEYS

SINGLE CHANNEL DUPLEX SPACE LINKED PULSE COMMUNICATIONS SYSTEM

This is a continuation of application Ser. No. 873,869, filed Nov. 4, 1969, now abandoned.

BACKGROUND OF THE INVENTION

There are many activities in which small groups of men working together require ready communication in the face of high ambient noise levels, spatial separation or a water surround, unimpeded by the "push to talk" switch of conventional transceivers. Early work in this field was reported by Lewis and Milner in the periodical "Wireless Engineer" of September 1936 on Pages 475 to 482. Improvements have been made in these pulse systems, but they are basically limited to two-station operation by the fact that each receives while the other transmits. The present invention extends the desirable qualities of such systems to more than two stations by using a continuously operative receiver having essentially only two output states to provide pulse to pulse control of the pulse period of its associated transmitter modulator in such sense that the pulse generator therein is brought into synchronism with the mean of the pulses received from other stations except for a phase difference. A further desirable quality is then achieved simultaneously, in that any one station needs only to communicate with one other station to communicate with all. In the ultimate, this permits stations separated by natural barriers to communicate by way of other properly located, perhaps untended, stations used as repeaters. Dual channel duplex stations have been used to provide similar functions, but two classes of stations are then present which must communicate in alternate order, thus restricting freedom of motion.

OBJECTS OF THE INVENTION

A primary object of the invention is to provide a means for mutual communication over a common space channel without manual mode switching.

More particularly, it provides means for establishing trains of pulses at a plurality of stations linked by a common space channel and means at said stations for maintaining a common repetition rate for said trains of pulses, while the repetition rate of the pulses is subject to intelligent control at each of two or more of the stations.

Additionally, it provides means for using semiconductor devices in their most reliable mode, namely as switching devices, to maintain synchronism among members of a group of synchronous pulse communication stations. The switching devices are used to directly alter the time constant of the clock oscillator in each station during reception of a pulse to attain the object of causing convergence of transmitted and received pulses.

DESCRIPTION OF THE DRAWINGS

A block diagram of a preferred embodiment of the invention appears in FIG. 1.

A composite diagram appears in FIG. 2, parallel to the diagram of FIG. 1. The significant components of the invention are here shown in exemplary schematic form, as an aid to a functional description.

Figure 2:
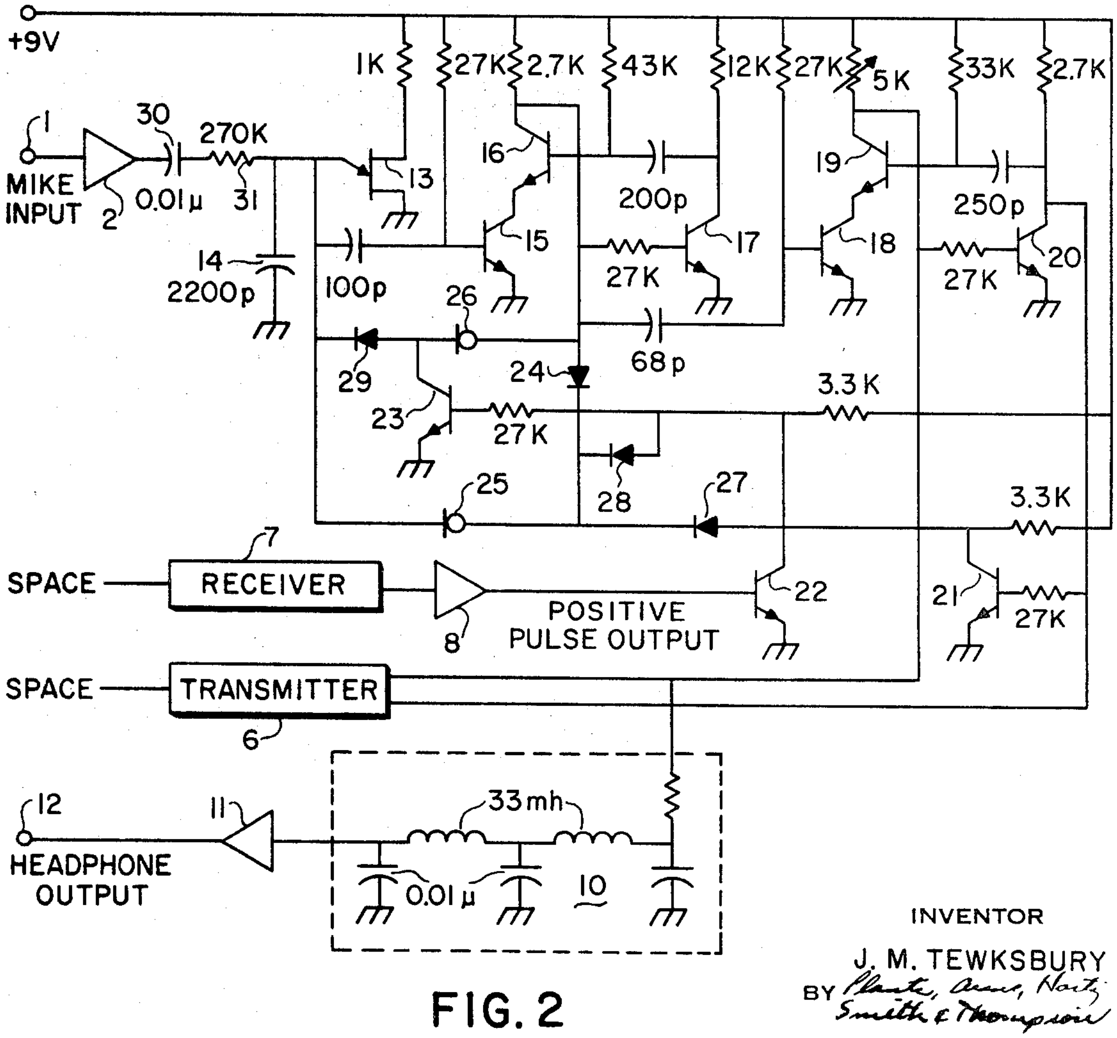
Figure 3:
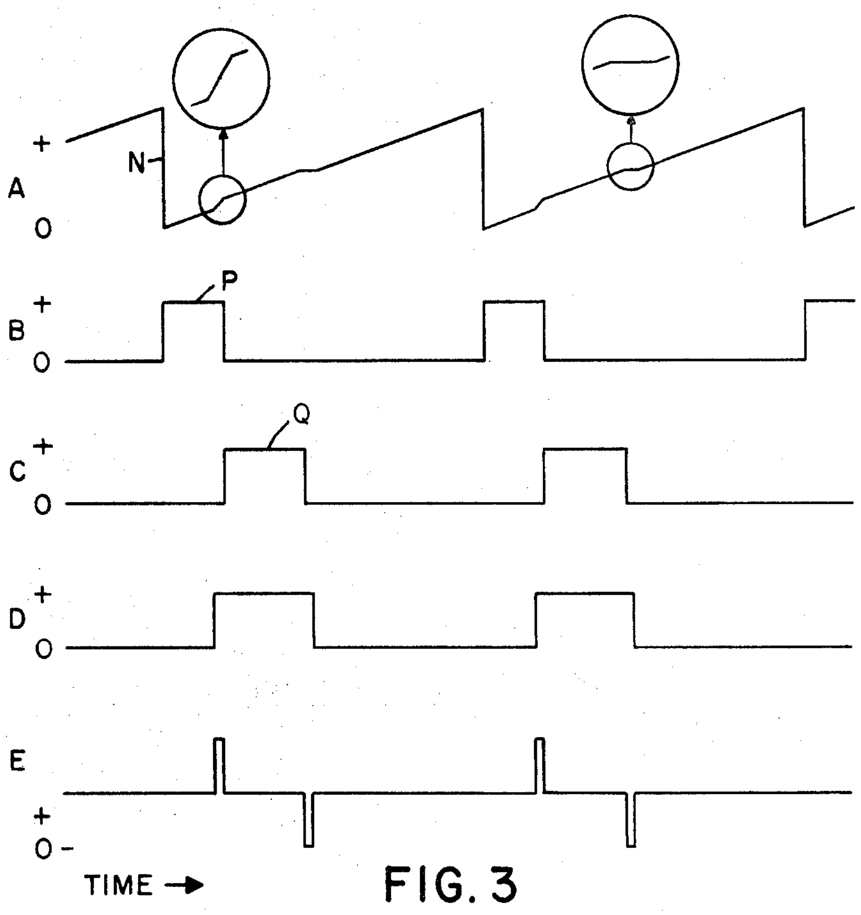

The waveforms at significant points in the circuit of FIG. 2 are illustrated to a common time scale in FIG. 3. The waveforms shown are idealized; in a physical realization, the corners of square waves will be visibly rounded, slopes will be finite, brief spikes may appear and so forth without significant influence on the functions of the circuits.

Figure 4:
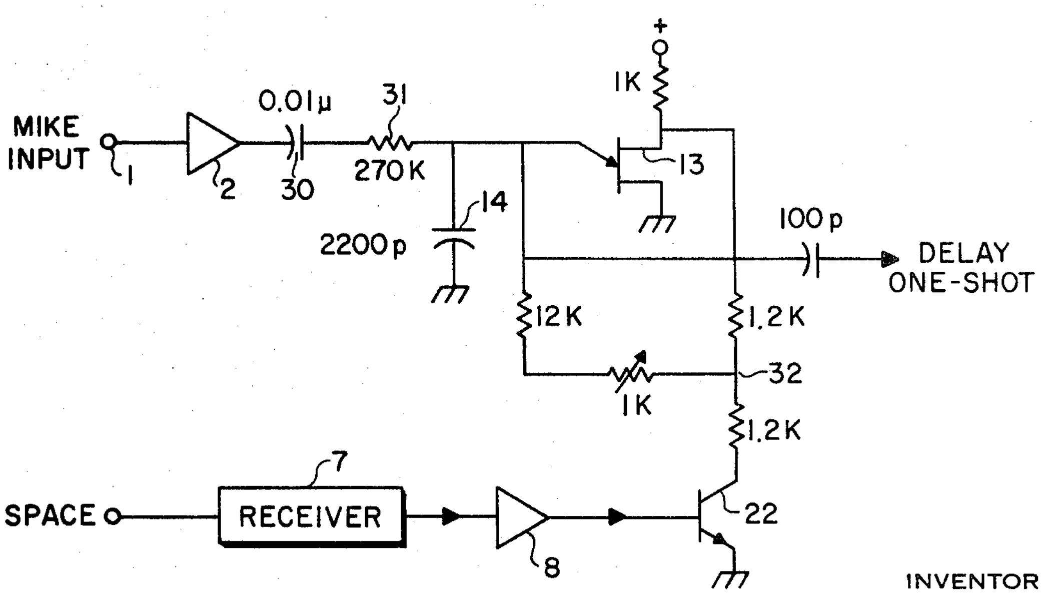

The simpler variant of the invention is detailed in the partial schematic of FIG. 4 which otherwise conforms to FIG. 2.

Figure 5:
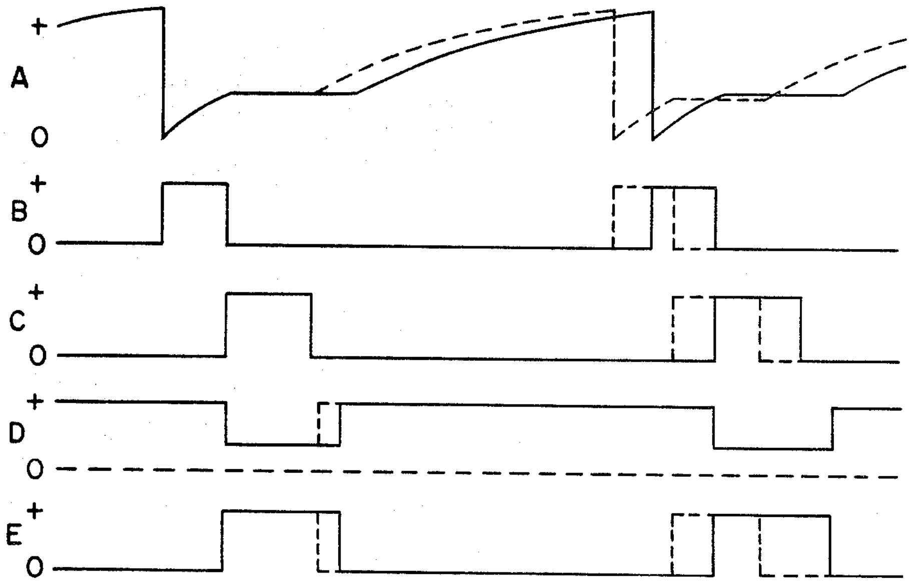

Waveforms peculiar to the circuit of FIG. 4 are shown in FIG. 5.

Figure 6:
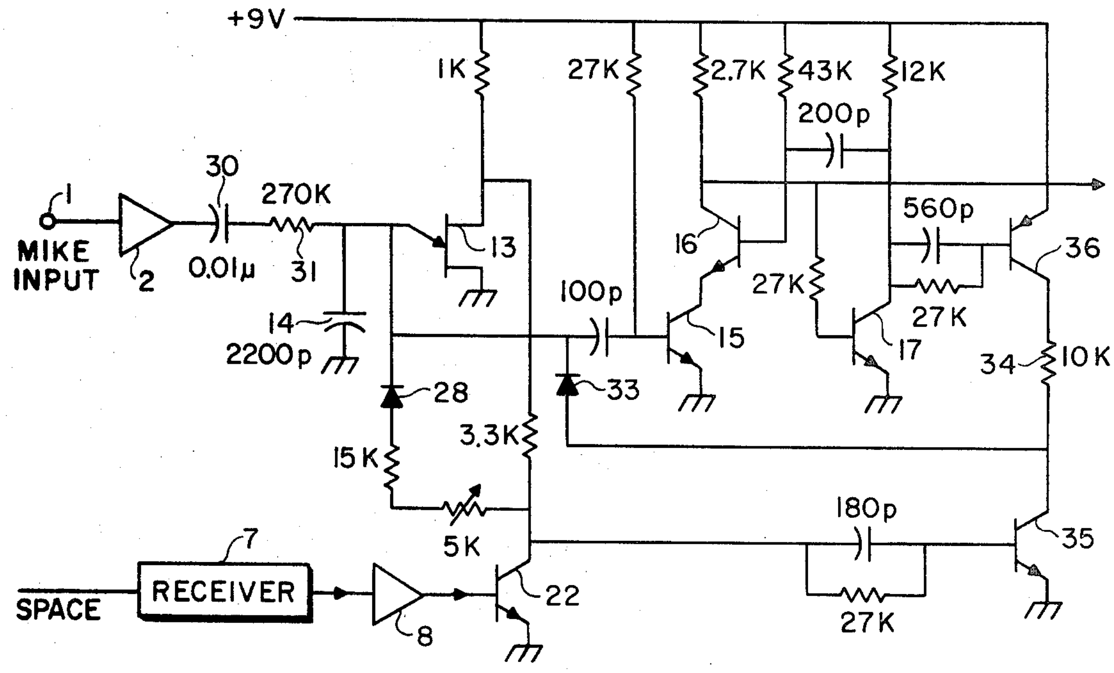

The circuit of FIG. 6 may be viewed as an improvement of FIG. 4, essentially equal to FIG. 2 in performance.

DESCRIPTION OF THE INVENTION

Figure 1:
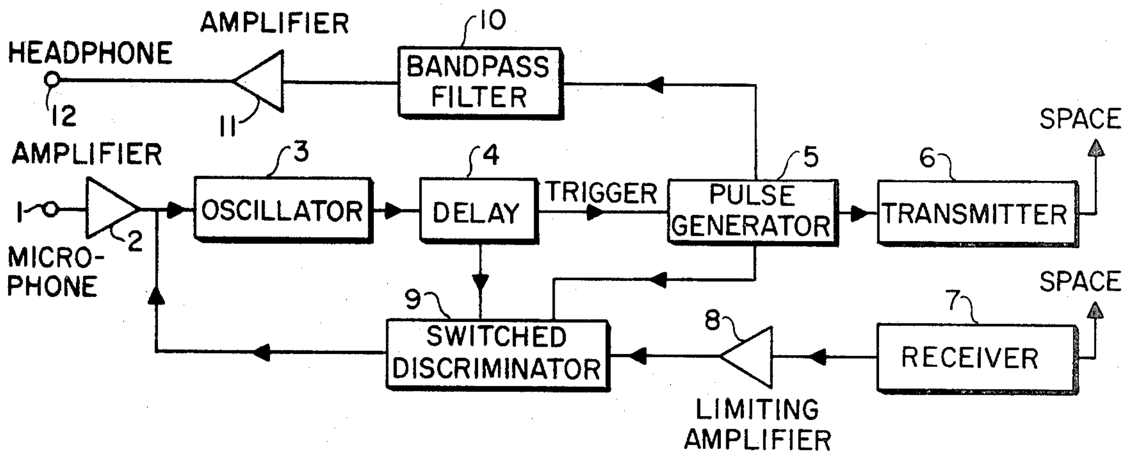

In the diagram of FIG. 1 a signal input at the terminal 1, here attributed to a microphone is applied by way of the amplifier 2 to a relaxation oscillator operating as a free-running pulse generator 3 so as to modulate the pulse period, or viewed inversely, the pulse repetition rate. The pulse repetition rate, at its lowest value, should be greater than twice the highest signal frequency. The output pulses from the generator 3 are conveyed to a delay circuit 4, conveniently a monostable relaxation oscillator. By using its recovery to trigger the pulse generator 5, a fixed time delay is introduced between the transition pulse of the astable pulse generator 3 and the triggering of the monostable oscillator 5. The constant duration output pulse of the monostable oscillator 5 is then used to turn on the transmitter 6, which may be simply an amplifier as in induction paging systems, a high frequency radio transmitter, a controllable optical source, etc. linked to space by an appropriate coupling such as a loop, an open antenna, a lens or the like. A receiver 7 adapted to the mode of communication is coupled to space by the same or parallel means so that it responds to the transmitter 6 associated with it and to similar transmitters in other like transceivers. The receiver 7 drives a limiting amplifier 8 so that received pulses are presented to a switched discriminator 9 as a train of square waves having abrupt transitions between two fixed values of voltage or current. In the switched discriminator the received pulses are compared to a pulse from the delay monostable oscillator 4 and the transmitted pulse monostable oscillator 5, arranged so that coincidence of the received pulse with the transmitted pulse will not vary the normal free-running output of the discriminator 9, but a received pulse starting before the transmitted pulse will change the output in a first sense in proportion to the departure from coincidence, and a received pulse occurring later than the transmitted pulse will change the output similarly in the opposite sense. A received pulse beginning before and ending after the transmitted pulse will produce a net change proportional to the departure from coincidence of the median points of the transmitted and received pulses. The output of discriminator 9 is applied to the pulse generating astable oscillator 3 to control its pulse to pulse period so that an output from the discriminator 9 in the first sense will hasten the occurrence of the next pulse from oscillator 3 and an output in the opposite sense will retard the occurrence of the next pulse from oscillator 3. Thus, when two or more transceivers are in mutual communication they will transmit in pulse synchronism, with phase differences dependent on path delays and departure of each from its natural period. The mutual pulse period thus established will be approximately a median of the shortest and longest natural periods represented in the group. When the pulse period of one or more members of the group is subjected to modulation by speech or other intelligence, all members of the group respond alike. A bandpass filter 10 may then be connected to the astable oscillator 3 or either of the monostable oscillators 4 or 5 or the transmitter input at a point where unidirectional pulses are found, to recover the modulation of all members of the group, since the average value of the pulses is directly proportional to their repetition rate. The variations in this average value are small, so an amplifier 11 is generally required to provide an adequate output at the terminal 12 for a headphone.

In an alternate version to be described more fully below with respect to FIG. 4, the switched discriminator is omitted and the output of the limiting amplifier 8 is applied directly to the pulse generating astable oscillator 3 to modify its period. In this case the duration of the pulses from the limiting amplifier 8 will be a minimum when all received pulses are coincident with the pulses from the transmitter 6. Pulses from other transceivers arriving either earlier or later than the pulses from the transmitter 6 will increase the duration of the pulses from the limiting amplifier 8. Hence, the pulse to pulse period of the pulse generating astable oscillator 3 can be influenced in only one sense by a lack of coincidence. If, for example, the sense of control is elected to increase the pulse to pulse period of the generator 3 as the control pulses from the limiting amplifier increase in duration, the pulse to pulse period of a transceiver will be increased from its natural free running value when it receives pulses from another transceiver. Members of a group of transceivers will have different natural pulse to pulse periods and consequently require different control potentials, so they fall into synchronism with a variety of phase relations between transmitted and received pulses. Similarly, changing the sense of control of the generator 3 by the pulse output of the limiting amplifier 8 would cause all members of a group to operate with pulse to pulse periods shorter than their natural periods.

The partial schematic of FIG. 2 contains block designations of conventional elements, identified by the numbers used in FIG. 1, and an exemplary but nonexclusive schematic of the novel combination of functions. Here the active element of the astable pulse generator 3 of FIG. 1 is the unijunction transistor 13, which periodically discharges the capacitor 14. The unijunction transistor used in this circuit is a 2N2646, an annular silicon PN type and all other transistors shown are 2N2222, an annular star silicon NPN useful as a high speed switch and general purpose amplifier through the VHF region. The active elements of the delay monostable oscillator 4 of FIG. 1 are the transistors 15, 16 and 17; in the quiescent state transistor 17 is non-conductive and transistors 15 and 16 are saturated. When the capacitor 14 discharges, a brief negative pulse to the base of transistor 15 turns it off, thus turning off transistor 16 and saturating transistor 17 for a period determined by the time constants of the circuit, in this instance 6 μs. Upon recovery, a negative pulse conveyed to the base of transistor 18 turns it off and produces an identical action for a period of 8 μs in the monostable oscillator comprising transistors 18, 19 and 20; this is the monostable oscillator 5 of FIG. 1. Output from the collectors of transistors 19 and 20 is used to turn on the transmitter 6 during the astable state of the oscillator 5; only one of these may be necessary, depending on the nature of the space link and the method of keying the transmitter.

In FIG. 2 the switched phase discriminator 9 of FIG. 1 comprises the transistors 21, 22 and 23 and their associated components; recharging of the capacitor 14 is controlled by this system. Immediately upon discharge of capacitor 14 through the unijunction transistor 13, the collector of the transistor 16 rises from about 0.4V. to the 9V. of the supply; current may then flow through the isolation diode 24 and the current limiting device 25 to the capacitor 14, but current flowing through the current limiting device 26 is diverted to ground through the normally saturated transistor 23. At the conclusion of the delay period of 6 μs the collector of transistor 16 will revert to 0.4V. The monostable oscillator 5 of FIG. 1 will then be triggered causing transistor 21 to cut off as transistor 20 saturates, thus providing a charging path through the isolation diode 27 and the same current limiting device 25, which persists for 8 μs. At the end of this period the potential at the collector of transistor 21 falls to 0.2V. but charging now continues through isolation diode 28 and the same current limiting device 25 until the capacitor 14 reaches the trigger potential of the unijunction transistor 13. During the first period of 6 μs current could flow through the diode 28 as well as the diode 24, but this is inconsequential because both paths lead to the same current limiting device 25. These are the conditions existing when the only output from the receiver 7 is that derived from its associated transmitter 6.

When a signal from another transceiver is present, the equilibrium conditions may be illustrated by FIG. 3, based on the assumption that the other transceiver has a somewhat shorter natural pulse to pulse period; hence, it will transmit slightly earlier. The potential across the capacitor 14 is represented on a common temporal base by FIG. 3A, the potential scale being expanded relative to the remainder of the figure for clarity. FIG. 3E represents the nearly constant charging current, with short intervals of enhanced current during which the capacitor potential increases at a corresponding rate and periods of current cut off during which the capacitor potential does not increase. Thus, immediately after the capacitor discharge, as illustrated by vertical line N of FIG. 3A, the delay monostable oscillator 4 is triggered so that the potential of the collector of transistor 16 will rise as indicated by pulse P in FIG. 3B, charging capacitor 14 through diode 24 and current limiting device 25. However, the receiver 7 responds to a signal received before its associated transmitter 6 is keyed on, and the output of the limiting amplifier 8, indicated at FIG. 3D, becomes positive while the collector of transistor 16 is still positive. When the transistor 22 saturates and transistor 23 cuts off in response to the receiver, the current flowing through the current limiting device 26 is diverted to charge the capacitor 14 through the isolation diode 29, hastening the rise of potential across capacitor 14. At the completion of the delay monostable oscillator 4 output pulse P (FIG. 3B) the pulse generator 5 is triggered to generate an output pulse which coincides with the pulse illustrated as pulse Q of FIG. 3C. This pulse generator 5 output pulse appears at the collector of transistor 19 and is connected to the input of transmitter 6. In this manner the transmission period begins, transistor 16 saturates and transistor 21 cuts off, as previously discussed, so the charging current reverts to the median value, but an incremental charge has been added which will shorten the pulse to pulse period. However, if a third transceiver having a slightly longer natural pulse to pulse period is on the scene, the output of the amplifier 8 will remain at its positive level for a short time after its associated transmitter 6 has ceased to transmit. The potential at the collector of transistor 21, indicated in FIG. 3C, will fall and current through diode 27 will cease, but transistor 22 remains saturated while the last signal continues. During this interval no charge is conveyed to the capacitor 14 and its potential ceases to rise, thus lengthening the pulse to pulse period. In this example of a transceiver having a median pulse to pulse period, the effect of the presence of one or the other of the postulated transceivers would be to accomodate its pulse to pulse period to that of its mate, which would also accomodate its period. However, when both of the postulated transceivers are present, they influence one another to the median period and their influence on the median transceiver is but a small residue, as here shown.

Provision has been made to superimpose a signal, nominally speech, as an auxiliary charging source for the capacitor 14, as shown by the coupling of the amplifier 2 by way of the capacitor 30 and resistor 31. The effect is to hasten charging on positive excursions of the signal, shortening the period, and reduce charging on the negative excursions, lengthening the period. Consequently, when a transceiver is modulated to transmit intelligence, it may have at one instant the shortest pulse to pulse period of any member of its group and a moment later the longest. Changes in period caused by modualtion are restrained by the compensation induced by other transceivers, when they are responding. The transitions from leading to lagging phase or the reverse are accomplished rapidly because compensation ceases for an instant; hence, crossover distortion is small if the transceivers are reasonably near to being alike. As a corollary, if a transceiver should lose contact with its group, its user will observe a rise in sidetone as a result of the greater modulation changes, enabling him to find a position which will establish contact. Of the several design factors, the transmission period is most significant so it is desirable that it should be adjustable by incremental adjustment of one of the elements of the monostable oscillator 5.

Recovery of the speech or other intelligence transmitted by other members of a group may be had by integrating the pulse output at any point in the chain of pulse generators. In the example of FIG. 2, the pulses at the collector of transistor 19 have been elected.

Variants of the system of FIG. 1 can be had by using a known double time constant multivibrator to combine the functions of the astable oscillator 3 and the monostable oscillator 4 or to combine the functions of the monostable oscillators 4 and 5. Other arrangements may be used to combine the pulses to obtain the controlled charging current for the capacitor 14 of FIG. 2, using, for example, established digital logic integrated circuit units. Also, the timing circuit of the oscillator 3 may be periodically charged and the discharge controlled, since either produces a change in the average value of the resistance element of a resistance-capacitance product; other equivalents are already known. The essence is that the pulse to pulse period should respond to reception occurring immediately before or after transmission.

An alternative embodiment of the invention wherein the switched phase discriminator 9 of FIG. 1 is omitted is shown in FIG. 4, where only the portions differing from FIG. 2 are detailed, with enough peripheral circuitry from FIG. 2 to permit ready orientation. Referring to FIG. 4, the rise in potential across the capacitor 14 is basically exponential in form, as illustrated in FIG. 5A, with an extended discontinuity, generally also exponential if any change in potential occurs. Pulses from the monostable oscillators 4 and 5 play no direct part in charging the capacitor 14, but are included as time markers where FIG. 5B is the delay period and FIG. 5C is the transmission period.

As in FIG. 2, the output of the limiting amplifier 8 is positive during reception from the associated transmitter 6 and any other transmitter in the group, as illustrated in FIG. 5E, where the dashed lines indicate functions in an individual free running system and full lines are typical of operation as a synchronized member of a group. The positive output of the limiting amplifier 8 saturates the otherwise non-conductive transistor 22 (FIG. 4) (which may be the final stage of amplifier 8), reducing the potential at the point 32 of the resistive network to about a third of its nominal value, as shown in FIG. 5D.

The dashed lines of FIG. 5 show the full cycle of events for an isolated station, the full lines the sequence for one synchronized to another station having a longer pulse to pulse period. This other station would, of course, receive a signal before transmitting, so the charging rate of its timing capacitor (not shown), which we may identify as 14', would be reduced in advance of its transmission, and would remain reduced until the output of its limiting amplifier 8' fell to near zero shortly after cessation of its transmission. The net effect in either case is to increase the pulse to pulse period. In practice it is found that the difference in control of the periods required to bring about equality is manifest only as a modest phase difference in a system. The change in period of all stations in a group may be used to provide an indication in each of any loss of contact.

As an alternative, a diode isolated charging path directly from the output of the limiting amplifier 8 in parallel with an unswitched resistive charging path may be used to increase the charging rate. With this relatively simple charging connection, the pulse to pulse period of a transceiver is reduced from its natural period when it is synchronized to another, if the receiver output is positive during reception, or increased if the receiver output is near ground during reception.

The station shown in FIG. 6 uses a different switched phase discriminator from that shown in FIG. 2. It has the attribute of interrupting the charging of the timing condenser 14 during reception of its own pulses or those arriving later in time, due to saturation of the transistor 22, thus interrupting the main charging path through the isolation or holding diode 28. The potential appearing across the condenser 14 thus resembles that of FIG. 5A. However, an auxiliary charging path providing about twice the main charging current has been provided through the diode 33, regulated by the resistor 34. This path becomes effective to shorten the pulse to pulse interval when the transistor 35 is turned off by a received pulse and the PNP transistor 36 is turned on by the delay monostable oscillator, corresponding to reception of a pulse before transmission begins. Despite the hiatus in the charging of the condenser 14 during the transmission period, the overall operation of transponding units is essentially identical to that discussed in connection with FIG. 2.

It is generally undesirable to isolate the receiver from the transmitter, so a radio link may use a common antenna and tuned circuits for both, and an acoustic link may use a common transducer; even an inductive link may best use a common coupling member. Optical transducers generally are not reversible, so cross coupling in the space path or, as earlier described, in the electrical circuit is necessary.

A timing circuit must include two or all of the three kinds of electrical impedance devices known as resistors, inductors and and capacitors. For the present purpose, one of these must be switched rapidly from one value to another for brief periods. In the present state of the art, resistors may be most readily switched, and are most often combined with capacitors to produce timing circuits. It is generally recognized that the resistor controls charging or discharging the current in a tuning circuit deriving its energy from a constant potential source and hence, that a change in the potential of the source is equivalent to a change in the value of the resistor. Thus, it should be evident that many equivalents to the circuits proposed herein may be devised.

I claim:

1. A common channel duplex pulse communication system, comprising at least a pair of stations, each of which includes a receiver and a transmitter;

modulating means for each transmitter, said modulating means providing a continuous pulse output and including means for varying the interval between pulses in accordance with an intelligence signal applied thereto;

synchronizing means for each station for adjusting the timing of pulses generated locally at one station for substantial coincidence with pulses received by that local station from any other station; and demodulating means for each receiver of each station pro-viding an output intelligence signal which is a composite of the input intelligence signals of all stations in the system.

2. A common channel, duplex pulse communication system having at least a pair of stations, each of which includes a receiver and a transmitter, said receiver being continuously operative to receive its transmissions as well as the transmissions of the other station of said pair modulator means at each station providing a pulse output in which the interval between pulses varies in accordance with intelligence to be transmitted from said station, and synchronizing means at each station exerting cyclic control upon said modulator means local to that station in response to the pulses received from the transmitter of the other of said stations.

3. A communications system as claimed in claim 2 wherein said modulator means includes a timing network of the relaxation type and further includes means for continuously altering the time constant of said network in response to the intelligence to be transmitted and means for cyclically altering the time constant of said network in response to output from said synchronizing means.

4. A communications system as claimed in claim 2 wherein said synchronizing means is additionally responsive to pulses received from the transmitter local to that station.

5. A communications system as claimed in claim 2 wherein said synchronizing means includes a comparator for determining the difference between the times of occurrence at the local station receiver of a locally transmitted pulse and a remotely transmitted pulse.

6. A communications system as claimed in claim 5 wherein said synchronizing means develops a control signal of one sense when a pulse from a remote transmitter is received prior to the occurrence of a pulse from the local transmitter and of the opposite sense when a pulse from the local transmitter terminates prior to the termination of a pulse received from a remote transmitter.

7. A single channel, polystation duplex communication system, including at least a first and a second station each having a pulse receiver and a pulse transmitter linking the station to said channel, comprising;

an oscillator, a keying circuit responsive to said oscillator to key said transmitter to transmit a pulse of fixed duration once in each cycle of said oscillator, means effective to vary the period of oscillation of said oscillator in accordance with intelligence to be transmitted, means responsive to said period to recover intelligence transmitted over said channel, means operative to establish substantial synchronism between the pulses transmitted and received at each of said first and second stations, and delay means intermediate said oscillator and said keying circuit to delay transmission of a pulse by a fixed delay interval.

8. A system as claimed in claim 7 wherein said last named means comprises a switch responsive to said pulse output, said switch having one condition of conductivity during the occurrence of a pulse in said pulse output and another condition of conductivity during the absence of a pulse.

9. A system as claimed in claim 8 wherein said switch alters a reference potential applied to an element of said network.

10. A system as claimed in claim 8 wherein said switch alters the effective value of an element of said network.

11. A system as claimed in claim 8 wherein said switch is serially connected with an auxiliary element of said network and a source of reference potential.

12. A system as claimed in claim 8 wherein said last named means includes means for inhibiting response of said switch to said pulse output during transmission of a pulse by said pulse transmitter.

13. A system as claimed in claim 8 wherein said last named means includes means for conditioning said switch for response to a pulse in said pulse output only during the said fixed delay interval.

14. A system as claimed in claim 8 with additionally, means responsive to said one condition of conductivity of said switch connected to said network to reduce the period of said oscillator, and means to condition said switch for response to a pulse in said pulse output only during said delay interval.

15. A system as claimed in claim 8 further comprising means responsive to said one condition of conductivity of said switch connected to said network to increase the period of said oscillator, and means for conditioning said switch for response to a pulse in said pulse output except during said delay interval.

16. A system as claimed in claim 8 further comprising means responsive to said one condition of conductivity of said switch connected to said network to increase the period of said oscillator, means for conditioning said switch for response to a pulse in said pulse output subsequent to transmission of a pulse by said pulse transmitter and prior to the return to said first electrical energy condition in said network.

17. A system as claimed in claim 7 wherein said last named means comprises a first control means effective to reduce the period of oscillation of said oscillator in response to a pulse in said pulse output, a second control means effective to increase the period of oscillation of said oscillator in response to a pulse in said pulse output, means to condition said first control means for response to a pulse in said pulse output only during said delay interval, and means to condition said second control means for response to a pulse in said pulse output during at least a portion of the remainder of a cycle of oscillation of said oscillator exclusive of said delay interval.

18. A single channel channel, polystation duplex pulse communication system, including at least a first and a second station each having a pulse receiver, a pulse transmitter linking the station to said channel and a power source, comprising in each station an oscillator including an active device and a variable rate charging circuit, the period of said oscillator depending upon the rate of charge of said charging circuit;

means for varying the rate of charge of said charging circuit in accordance with an intelligence signal;

means for delaying the output of said oscillator;

keying means for said transmitter controlled by the delayed output of said oscillator;

means responsive to the period of said oscillator for re-covering intelligence transmitted over said channel; and synchronizing means to establish substantial synchronism between the pulses transmitted and received at each of said stations, said synchronizing means altering the rate of charge of said charging circuit during the presence of a received pulse.

19. A system as claimed in claim 18 wherein said synchro-nizing means comprises switching means responsive to a received pulse for reducing the rate of charge of said charging circuit.

20. A system as claimed in claim 19 wherein said charging circuit includes a current source and a resistor for limiting current from said source and thereby regulating the rate of charge of said charging circuit and wherein said switching means reduces the rate of charge of said charging circuit by altering the value of said resistor.

21. A system as claimed in claim 19 wherein said synchronizing means includes an additional switching means for altering the value of said resistor to increase the rate of charge of said charging circuit when a pulse is received during the presence of output from said oscillator in said delay means.

22. The system claimed in claim 7 wherein said means operative to establish substantial synchronism comprises:

a timing network connected in said oscillator to establish the period of said oscillator, said oscillator comprising an active device connected to said timing network and responsive to a first electrical energy condition therein to switch it to a second electrical energy condition to maintain electrical oscillations therein, and means coupling the pulse output of said receiver to said oscillator to control during said receiver pulse output the return of said network from said second electrical energy condition to said first electrical energy condition.

23. A local station comprising:

means for receiving a train of pulses from a remote station;

means for transmitting a second train of pulses;

an oscillator;

a keying circuit responsive to said oscillator for generating a pulse of fixed duration once in each cycle of said oscillator;

a timing network connected in said oscillator to establish the period of said oscillator, said oscillator comprising an active device connected to said timing network and responsive to a first energy condition therein to switch it to a second energy condition to maintain oscillations;

delay means intermediate said oscillator and said keying circuit to delay generation of said pulses of fixed duration by a fixed delay interval after said second electrical energy condition has been established, a plurality of the delayed pulses comprising said second pulse train; and, means responsive to the received train of pulses for controlling the return of said timing network from said second energy condition to said first energy condition.

24. The station of claim 23 wherein the last named means comprises a switch responsive to said received train of pulses, said switch having one condition of conductivity during the occurrence of a pulse in said received train of pulses and another condition of conductivity during the absence of a pulse

25. A station as claimed in claim 23 wherein said switch alters a reference potential applied to an element of said timing network.

26. A station as claimed in claim 23 wherein said switch alters the effective value of an element of said timing network.

27. A station as claimed in claim 23 wherein said switch is serially connected with an auxiliary element of said timing network and a source of reference potential.

28. A station as claimed in claim 23 wherein said last named means includes means for inhibiting response of said switch to said received train of pulses during transmission of a pulse by said transmitting means.

29. A station as claimed in claim 23 wherein said last named means includes means for conditioning said switch for response to a pulse in said received train of pulses only during said fixed delay interval.

30. A station as claimed in claim 24 wherein said last named means includes means responsive to said one condition of conductivity of said switch connected to said timing network for reducing the period of said oscillator, and means for conditioning said switch for response to a pulse in said received train of pulses only during said delay interval.

31. A station as claimed in claim 24 further comprising means responsive to said one condition of conductivity of said switch connected to said network to increase the period of said oscillator, and means to condition said switch for response to a pulse in said pulse output except during said delay interval.

32. A station as claimed in claim 24 further comprising means responsive to said one condition of conductivity of said switch connected to said network to increase the period of said oscillator, means to condition said switch for response to a pulse in said pulse output subsequent to transmission of a pulse by said pulse transmitter and prior to the return to said first electrical energy condition in said network.

33. A station as claimed in claim 23 wherein the last named means comprises a first control means effective to reduce the period of oscillation of said oscillator in response to a pulse in said received train of pulses, a second control means effective to increase the period of oscillation of said oscillator in response to a pulse in said pulse output, means to condition said first control means for response to a pulse in said received train of pulses only during said delay interval, and means to condition said second control means for response to a pulse in said received train of pulses during at least a portion of the remainder of a cycle of oscillation of said oscillator exclusive of said delay interval.

34. A single channel station including at least a pulse receiver and a pulse transmitter linking the station to said channel comprising:

an oscillator including an active device and a variable rate charging circuit, the period of said oscillator depending upon the rate of charge of said charging circuit;

means for delaying the output of said oscillator;

keying means for said transmitter controlled by the delayed output of said oscillator; and synchronizing means for establishing substantial synchronism between pulses transmitted from said station and received at said station, said synchronizing means altering the rate of charge of said charging circuit during the presence of a received pulse.

35. The station of claim 34 with additionally means responsive to the period of said oscillator for recovering intelligence transmitted over said channel.

36. The station of claim 34 with additional means for varying the rate of charge of said charging circuit in accordance with an intelligence signal.

37. A system as claimed in claim 34 wherein said synchronizing means comprises switching means responsive to the presence of a received pulse for reducing the rate of charge of said charging circuit.

38. A system as claimed in claim 37 wherein said charging circuit includes a current source and a resistor for limiting current from said source and thereby regulating the rate of charge of said charging circuit and wherein said switching means reduces the rate of charge of said charging circuit by altering the value of said resistor.

39. A system as claimed in claim 37 wherein said synchronizing means includes an additional switching means for altering the value of said resistor to increase the rate of charge of said charging circuit when a pulse is received during the presence of output from said oscillator in said delay means.

* * * * *

UNITED STATES PATENT OFFICE
CERTIFICATE OF CORRECTION

Patent No. 3,750,179 Dated July 31, 1973

Inventor(s) John M. Tewksbury

It is certified that error appears in the above-identified patent and that said Letters Patent are hereby corrected as shown below:

In the Abstract, line 4, "a local of" should be --of a local--.
In claim 1, line 15, "pro-viding" should be --providing--.
In claim 8, line 1, "claim 7" should be --claim 22--.
In claim 17, line 1, "claim 7" should be --claim 22--.
In claim 18, line 16, "re-covering" should be --recovering--.
In claim 19, line 2, "chro-nizing" should be --chronizing--.
In claim 25, line 1, "claim 23" should be --claim 24--.
In claim 26, line 1, "claim 23" should be --claim 24--.
In claim 27, line 1, "claim 23" should be --claim 24--.
In claim 28, line 1, "claim 23" should be --claim 24--.
In claim 29, line 1, "claim 23" should be --claim 24--.

Signed and sealed this 1st day of January 1974.

(SEAL)
Attest:

EDWARD M.FLETCHER,JR.
Attesting Officer

RENE D. TEGTMEYER
Acting Commissioner of Patents